United States Patent Office 2,878,161
Patented Mar. 17, 1959

2,878,161
PREPARATION OF URICASE

Kenneth C. Robbins and Norman H. Grant, Chicago, Ill., assignors to Armour and Company, Chicago, Ill., a corporation of Illinois No Drawing. Application March 2, 1955
Serial No. 491,774

2 Claims. (Cl. 195—66)

This invention relates to the preparation of uricase, and more particularly to reproducible methods of obtaining a uricase substance in high yield and purity.

Uricase is the enzyme which catalyzes the oxidation of uric acid to allantoin. Uric acid is present in numerous species of animals and while it is contained in the urine of mammals in the soluble form, the uric acid is included in the excretion of birds and reptiles as a solid. Also, while uricase is present in the liver of lower mammals, it is absent in the higher primates, and particularly is not found in human beings. Thus, in pathological conditions, involving uricemia, i. e. wherein an excess of uric acid is contained in the blood stream, such as gout, arthritis and other inflammatory diseases, a reduction of the uric acid content of the blood stream has been obtained upon the parenteral administration of uricase in animals and human beings. Also, uricase has been utilized in the clinical analysis of the uric acid content in the blood of humans in diagnostic procedures. The processes heretofore employed for preparing uricase, being directed to the production of small quantities of the enzyme for laboratory and clinical experimentation, involved numerous and laborious steps resulting in a relatively low yield of product. Consequently, these processes are not adaptable to the large scale manufacture of uricase for widespread pharmaceutical purposes.

Therefore, it is an object of this invention to provide methods of preparing uricase which are adaptable to large scale manufacture. Another object is to provide reproducible methods of obtaining uricase in high yield and purity. Still another object is to provide methods of producing a uricase substance of a purity suitable for parenteral administration.

In one aspect of this invention a uricase substance is prepared by a method involving separating the nucleoprotein constituents from uricase-bearing tissue, and thereafter extracting the uricase substance from the residue of such tissue. In the experimentation leading to the present invention it was discovered that pentosenucleoprotein and desoxypentosenucleoprotein substances were peculiarly associated with the uricase enzyme in uricase-bearing tissue. Furthermore, it was discovered that since these nucleoprotein substances had physical and chemical properties similar to those of uricase, highly purified uricase products usually contained a substantial amount of these nucleoprotein substances as contaminants. In addition, it was found to be most difficult to separate these nucleoproteins subsequent to the concentration and purification of the uricase. However, it has now been discovered that when the nucleoprotein substances are separated from uricase-bearing tissue, prior to extraction of uricase, a purified uricase product can be obtained in reproducibly high yield. These nucleoproteins may be separated from the uricase-bearing tissue by contacting such tissue with water having a pH of from 3 to 11, and then separating the resulting extract from the tissue residue. Alternatively, nucleoproteins can be separated from tissue by extraction thereof with an aqueous solution having a pH of from 3 to 8.5 and an ionic strength of not more than 0.1, prior to the extraction of uricase from such tissue An example of the separation of nucleoprotein constituents from uricase-bearing tissue prior to the extraction of uricase therefrom, involves extracting this tissue with water, and thereafter extracting the residue of this tissue with a neutral aqueous saline solution having an ionic strength of not more than 0.1 to obtain a tissue residue from which the uricase enzyme may be prepared.

Although any uricase-bearing tissue may be employed as a starting material in the processes of this invention, especially desirable results are obtained with mammalian liver tissue derived from hogs, cattle or sheep. Preferably, these uricase-bearing tissues are subdivided in particle size by such methods as comminution or hashing to insure a greater degree of contact between such tissue particles and the solvents employed in the herein disclosed fractionation procedures. In addition, when it is required to store this tissue for a period of time prior to processing, it is desirable to refrigerate such tissue to prevent undue deterioration or decomposition and possible losses in uricase yield.

The term ionic strength as employed herein can be defined, with respect to a solution, by the equation ionic strength=$\frac{1}{2}\Sigma Cz^2$, wherein $C$ and $z$ are respectively the molar concentration and the valence of any kind of ion in the solution and the summation in this equation is to be extended over every kind of ion present in such solution. Also, the term valence herein refers to the combining capacity of a salt ion relative to that of a hydrogen atom which is taken as unity, and can be any integer from 1 to 7. Furthermore, the terms ion valence and anion valence refer to the combining capacity of ions and anions respectively, and in the latter term indicate specifically the number of electrons which such ion can take up. The activity of the uricase substance is expressed herein with reference to the $Q_{O_2}$ (protein), which can be defined as the microliters of oxygen consumed in the catalytic oxidation of uric acid substrate per mg. of enzyme protein per hour of time. These enzyme activity measurements can be obtained in a conventional Warburg manometric procedure at a temperature of 37° C. In this procedure, the substrate ingredients are introduced into the Warburg reaction chamber prior to the enzyme solution. The substrate ingredients consist of 40 micromoles of uric acid in the form of lithium urate dissolved in one milliliter of water, and 0.5 to 1 milliliter of 0.1 M glycine buffer at pH 9.3. The enzyme is dissolved in sodium carbonate or sodium carbonate-glycine buffer at pH 9.6 to 10.0, combined with distilled water to a total volume of 3.0 milliliters, and introduced into the reaction chamber. The center wall of the reaction chamber should contain 0.2 milliliter of 20% potassium hydroxide and a small strip of fluted filter paper. The gas phase will be air, and the mixture should be equilibrated for 5 minutes. The reaction is then carried out for a period of 60 minutes with readings taken at 10-minute intervals. In order to obtain results of suitable accuracy, the enzyme concentration in the reaction mixture should be adjusted to produce an oxygen uptake of between 50 and 200 microliters per hour. The average oxygen uptake between 20 to 40 minutes, which will usually be on the linear portion of the analytical curve, should be taken to represent the average rate of reaction. This value can then be used to calculate the specific enzyme activity. The protein concentration of the enzyme product can be determined by the conventional biuret method employing crystalline bovine albumin as the protein standard.

There are also associated with the uricase substance in uricase-bearing tissue, water soluble and salt-soluble protein constituents which may be effectively separated therefrom prior to extraction of the uricase by the methods hereinbefore disclosed. In addition, euglobulin factors are generally associated with the enzyme in uricase-bearing materials, and are most difficultly separated therefrom due to the similarity in chemical and physical properties thereof. These euglobulins may be effectively separated from the uricase-bearing tissue, prior to extraction of the uricase substance, by a method which involves contacting uricase-bearing material and an aqueous saline solution having a pH of from 8.0 to 8.6 and an ionic strength of not more than 0.1, and then separating the resulting extract from the residue of such material. Thereafter, this residue may be subjected to uricase extraction.

The uricase substance may be extracted from uricase-bearing tissue, or from uricase-bearing material which has been treated to separate therefrom such undesirable and difficultly removable contaminants as nucleoproteins, water-soluble proteins, salt-soluble proteins and euglobulins, by contacting the uricase-bearing material with an aqueous saline solution having a pH higher than the isoelectric pH range of the uricase substance and an ionic strength of at least 0.2. Also, this aqueous extractant solution should contain at least one salt having an ion valence greater than 1. We have found that when the pH of the extractant solution is decreased, substantially all of the uricase can still be extracted from the tissue by increasing the ionic strength thereof. This uricase extract can be separated from the residue of such tissue to provide an aqueous concentrate of the enzyme. The term isoelectric pH range employed herein refers to the pH range wherein a substance has a neutral charge, i. e. the pH range below which the substance reacts as an acid and above which reacts as a base. In physical chemistry the pH of electric neutrality or zero potential is expressed as a specific pH value for a particular substance which is referred to as the isoelectric point thereof. However, with reference to mixtures of protein, and especially in relation to the fractionation of protein mixtures, it is most difficult to ascertain a precise isoelectric point therefor, and more exactly the zero potential of a protein mixture should be expressed as a range of pH. The isoelectric range of uricase is approximately from pH 5.0 to 6.0. The extraction of a uricase substance from this uricase-bearing material can be obtained with even better results by employing an aqueous saline extractant solution having a pH of at least 8.5 and an ionic strength of at least 0.2. In the alternative, the uricase substance may be extracted from the uricase-bearing material by contacting such material with an aqueous saline solution having a pH of at least 8.5 and containing a salt having an ion valence greater than 1, and subsequently separating the resulting uricase extract from the residue of such material.

This aqueous concentrate of uricase may be further fractionated with alcohol by a method which involves mixing an aqueous uricase concentrate with an alcohol, selected from the group consisting of methanol and ethanol i. e. an aliphatic alcohol containing less than 3 carbon atoms, in such volume as to produce a final alcohol concentration in the resulting mixture of between 10 and 50%. The fractionation of the uricase included in the aqueous alcohol mixture may be obtained at a pH higher than the isoelectric pH range of the uricase substance, at an ionic strength of at least 0.05, and at a temperature of from 0 to −10° C. Also, we have found that an amino acid uricase-stabilizing agent, such as glycine, may be included in this alcohol fractionation mixture to obtain even greater enhancement of the uricase potency. It is believed that when glycine is included in this alcohol fractionation mixture contaminant proteins associated with the uricase are denatured and the solubility characteristics thereof are altered while the uricase is stabilized by the amino acid ingredient and insolubilized. This uricase precipitate can be separated from the alcohol mixture to be further purified or utilized as a commercial product. The further purification of this uricase substance can be obtained by an alcohol fractionation step which involves mixing an aqueous uricase concentrate, e. g., the alcohol purified uricase substance hereinbefore described, with an alcohol of the group consisting of methanol and ethanol in such amount as to produce in the resulting mixture an alcohol concentration of between 10 and 40%. The fractionation of uricase, included in this alcohol mixture may be obtained at a temperature of from 0 to −10° C., at a pH within the range of 9.5 to 10.5, and at an ionic strength between 0.1 and 0.4. In this fractionation step, uricase is retained in solution while certain contaminant factors are rendered insoluble and precipitated. This precipitate can be separated from the supernatant liquid, and the uricase in such liquid may be further purified or utilized as a commercial product. An additional purification of the uricase substance may be obtained by an alcohol fractionation step which involves mixing with an aqueous uricase concentrate, e. g. the supernatant liquid obtained from the previous alcohol fractionation, either methanol or ethanol in such amount as to produce in the resulting mixture an alcohol concentration of from 10 to 40%. This alcohol fractionation may be obtained at a temperature of from between 0 and −10° C., an ionic strength of from 0.1 to 0.4 and a pH between 5.0 and 7.0. In this fractionation step, the uricase substance is precipitated and certain contaminants thereof are retained in the soluble form in the supernatant liquid.

The uricase substance obtained at any step in the process herein disclosed can be dried by such methods as lyophilization and spray drying to produce suitable commercial products. Also, this substance may be sterilized by suitable procedures in order to produce pharmaceutical products suitable for parenteral administration. Furthermore, preservative agents may be utilized in the various steps or in the final product to inhibit bacterial decomposition of the uricase or associated constituents.

In the preferred practice of this invention, uricase is extracted from uricase-bearing tissue and subjected to purification to obtain a product in high yield and of a purity especially desirable for pharmaceutical purposes. The following example will serve to further illustrate this preferred practice:

To one kilogram of fresh, frozen comminuted liver tissue was added 3000 ml. of ice-cold distilled water, and this extraction slurry was agitated for a period of sixteen hours at a temperature of 1° C. Then, the tissue residue was separated from the extract by centrifugation at 4000 R. P. M. for a period of one hour at a temperature of 1° C. This aqueous extract, having a pH of 6.2 to 6.4, contained 25 to 35 mg. of protein per ml. and a uricase activity, in terms of $Q_{O_2}$ (protein), of 0 to 1. This extract was found to contain the major portion of water-soluble protein and non-protein impurities, together with a large portion of pentosenucleoproteins and a small portion of desoxypentosenucleoproteins, and was discarded.

The tissue residue from the previous step was suspended in 3000 ml. of ice-cold 0.045 M phosphate buffer at pH 7.7 (six parts of disodium phosphate and 1 part of monopotassium phosphate), and the resulting mixture was agitated for a period of sixteen hours at a temperature of 1° C. The extract thereupon formed was separated from the tissue residue by centrifugation at 4,000 R. P. M. for a period of one hour at a temperature of 1° C. This extract, having a pH of 7.2 and containing 18 to 23 mg. of protein per ml. with a $Q_{O_2}$ (protein) of 1 to 2, was discarded. This extract was found to contain the bulk of the desoxypentosenucleoproteins and the remainder of the pentosenucleoproteins.

The tissue residue from the previous step was suspended in 3000 ml. of ice-cold 1 M sodium chloride and the resulting mixture was agitated over night at a temperature of 1° C. The extract thus produced was separated from the tissue residue by centrifugation at 4,000 R. P. M. for a period of one hour at a temperature of 1° C. This extract, which was found to contain 5 to 10 mg. of protein per ml., and found to have uricase activity, in terms of $Q_{O_2}$ (protein), of 0 to 4, was discarded.

The tissue residue from the previous step was suspended in 3000 ml. of ice-cold 0.05 M Sorenson borate buffer at a pH of 8.7 (2.43 parts of 0.05 M sodium borate and 1 part of 0.1 N hydrochloric acid), and the resulting mixture was stirred overnight at a temperature of 1° C. The extract thus produced was separated from the tissue residue by centrifugation at 4,000 R. P. M. for a period of one hour at 1° C. This extract, having a pH of 8.3 to 8.4, and found to contain 5 to 10 mg. of protein per ml. with a uricase activity in terms of $Q_{O_2}$ (protein) of 0 to 4, was discarded.

The tissue residue from the previous step was suspended in 3000 ml. of ice-cold 0.27 M sodium carbonate-10.1 M glycine buffer having a pH of 10.2, and the resulting mixture was stirred overnight at a temperature of 1° C. The uricase extract thereupon formed was separated from the tissue residue by centrifugation at 4,000 R. P. M. for a period of one hour at a temperature of 1° C., and such residue was discarded. This extract, having a pH of 10, was found to contain 2 to 4 mg. of protein per ml. and a uricase activity, in terms of $Q_{O_2}$ (protein) of 24 to 35. The yield of uricase in this step was calculated as 46 to 54% of the available enzyme in the tissue.

The uricase extract from the previous step was mixed with 1 N hydrochloric acid in such amounts as to adjust the pH thereof to 7.3±0.2. Then, 95% ethanol, refrigerated to a temperature of —25° C., was added to the extract to a final concentration of 40% ethanol at a temperature of —5° C. The resulting alcohol mixture had a protein concentration of 1.7±0.6 mg. per ml., a pH of 7.3±0.2, an ionic strength of 0.26±0.02, an ethanol concentration of 40%, and a temperature of —5° C. This mixture was held overnight at a temperature of —5° C., and the precipitate thus formed was separated from the supernatant liquid by centrifugation at a speed of 4,000 R. P. M. for a period of 30 minutes and a temperature of —5° C. This precipitate was suspended in 1200 ml. of ice-cold 0.02 sodium carbonate at 1° C., and the resulting suspension was stirred overnight at a temperature of 1° C. The supernatant liquid was separated from the precipitate in this suspension by centrifugation at a speed of 4,000 R. P. M. for a period of one hour and a temperature of 1° C. This supernatant liquid, having a pH of 10, was found to contain 1 to 2 mg. of protein per ml. and a uricase activity, in terms of $Q_{O_2}$ (protein), of 90 to 210. This potency was calculated as equivalent to a step yield of 70 to 80% and an over-all process yield of 37 to 43%.

The supernatant liquid obtained in the previous step was mixed with sodium chloride to a final concentration of 0.26 M. Thereafter, 95% ethanol, refrigerated to a temperature of —25° C., was added to this liquid to a final concentration of 40% ethanol at a temperature of —5° C. The resulting alcohol mixture had a protein concentration of 0.9±0.3 mg. per ml., a pH of 9.9±0.2, an ionic strength of 0.15, an ethanol concentration of 40%, and a temperature of —5° C. This mixture was held overnight at —5° C., and the precipitate thereupon formed was separated from the supernatant phase by centrifugation at a speed of 4,000 R. P. M. for a period of 30 minutes and a temperature of —5° C. This precipitate was discarded, and the pH of the centrifugate was adjusted to pH 6.3±0.2 with 1 N hydrochloric acid. The resulting mixture was held overnight at a temperature of —5° C., and the precipitate thereupon formed was separated from the supernatant liquid by centrifugation at a speed of 4,000 R. P. M. for a period of one hour and a temperature of —5° C. This centrifugate was discarded, and the precipitate was suspended in 120 ml. of ice-cold 0.01 M sodium carbonate at a temperature of 1° C. The resulting uricase solution had a pH of 10, and was found to contain 1 to 2 mg. of protein per ml. with a uricase activity, in terms of $Q_{O_2}$ (protein), of 1150 to 1250. This potency figure indicated a step yield of 90 to 100% and an over-all process yield of 35 to 38%.

The uricase solution from the previous step was further purified by precipitation of the enzyme at a pH 8.6±0.3, a protein concentration of 1.2±0.4 mg. per ml., an ionic strength of 0.12±0.04, an ethanol concentration of 20%, and a temperature of —5° C. The uricase activity of this precipitate, in terms of $Q_{O_2}$ (protein), was determined to be 2,000 to 2,800, and step yield was calculated to be 70 to 90%.

If desired, these uricase fractions can be stored at a temperature of 1° C. for several months without loss in enzyme potency. In addition, these partially purified uricase preparations can be dialyzed at a pH of 10 and dried, for example, by lyophilization without loss of potency. Furthermore, thioacetic acid, dithioacetic acid, cysteine and glutathione have been found to accelerate the uptake of oxygen in the oxidation of uric acid by uricase, and the effect of cysteine in this oxidation system is especially significant in that increasing concentration of cysteine therein produce an increased rate of oxidation over the concentration ranges studied.

The analyses of nucleoprotein performed at the various steps in the aforementioned process were obtained by the well known orcinol reaction for pentosenucleoproteins and the diphenylamine reaction for desoxypentosenucleoproteins.

While in the foregoing specification various embodiments of this invention have been set forth and specific details thereof elaborated for the purpose of illustration, it will be apparent to those skilled in the art that this invention is susceptible to other embodiments and that many of these specific details can be varied widely without departing from the basic spirit and concept of the invention.

We claim:

1. In a process for preparing uricase, the steps of contacting uricase-bearing tissue with water at a pH of from 3 to 11, separating the resulting extract from the tissue residue, then contacting the tissue residue with an aqueous saline solution having a pH of from 3 to 8.5 and an ionic strength of not more than 0.1, separating the resulting extract from the tissue residue, subsequently contacting the separated tissue residue with an aqueous saline solution having a pH of from 8.0 to 8.6 and an ionic strength of not more than 0.1, separating the resulting extract from the tissue residue, and thereafter extracting uricase from the separated tissue residue.

2. In a process for preparing uricase, the steps of contacting uricase-bearing tissue with water at a pH of from 3 to 11, separating the resulting extract from the separated tissue residue, then contacting the tissue residue with an aqueous saline solution having a pH of from 3 to 8.5 and an ionic strength of not more than 0.1, separating the resulting extract from the tissue residue, subsequently contacting the separated tissue residue with an aqueous saline solution having a pH of from 8.0 to 8.6 and an ionic strength of not more than 0.1, separating the resulting extract from the tissue residue, thereafter contacting the separated tissue residue with an aqueous saline solution having a pH of at least 8.5 and an ionic strength of at least 0.2 and containing at least one salt having an ion valence greater than 1, separating the resulting uricase extract from the tissue residue, mixing with said uricase extract an alcohol selected from the group consisting of methanol and ethanol to produce in the resulting alcohol mixture an alcohol concentration of from 10 to 50% by volume, adjusting said alcohol mixture to a pH alkaline to the isoelectric range of uricase and an ionic strength of at least 0.05 at a temperature of from 0 to −10° C. to selectively precipitate uricase, separating said precipitate from the supernatant liquid, suspending the separated precipitate in water to form an aqueous concentrate of uricase, mixing with said aqueous concentrate an alcohol of the group consisting of ethanol and methanol to produce in the resulting alcohol mixture an alcohol concentration of from 10 to 40% by volume, adjusting said alcohol mixture to a pH of from 9.5 to 10.5 and an ionic strength of from 0.1 to 0.4 at a temperature of from 0 to −10° C. to selectively solubilize uricase, separating the resulting precipitate from the uricase solution, adjusting said uricase solution to a pH of from 5.0 to 7.0 to selectively precipitate uricase, and separating said precipitate from the supernatant liquid.

References Cited in the file of this patent

Goleotti: Vers einer Isol, des uricolyt F. Biochem Z., 30 (1911), pp. 374–383.

Waksman et al.: Enzymes, 1926, Williams & Wilkins, Baltimore, Md., p. 241.

"Biochemical Journal," vol. 33, 1939, pp. 1901 to 1906.

Oppenheimer: Die Fermente und ihre Wirkungen, 5th Auflage, Lithoprint by Edwards Bros. Inc., Ann Arbor, Mich., 1943, pp. 1731–1732.

"Archives of Biochemistry," vols. 21–22, 1949, pp. 158 ot 161.

"Biochemical Journal," vol. 54, 1953, pp. 393 to 396.

Sumner et al.: Chemistry and Methods of Enzymes, 3rd ed., 1953, Academic Press, N. Y., pp. 307–309.